Feb. 6, 1962 W. G. FALTIN 3,019,954
CLIP FOR VEHICLE DASHBOARD
Filed Dec. 19, 1957 2 Sheets-Sheet 1
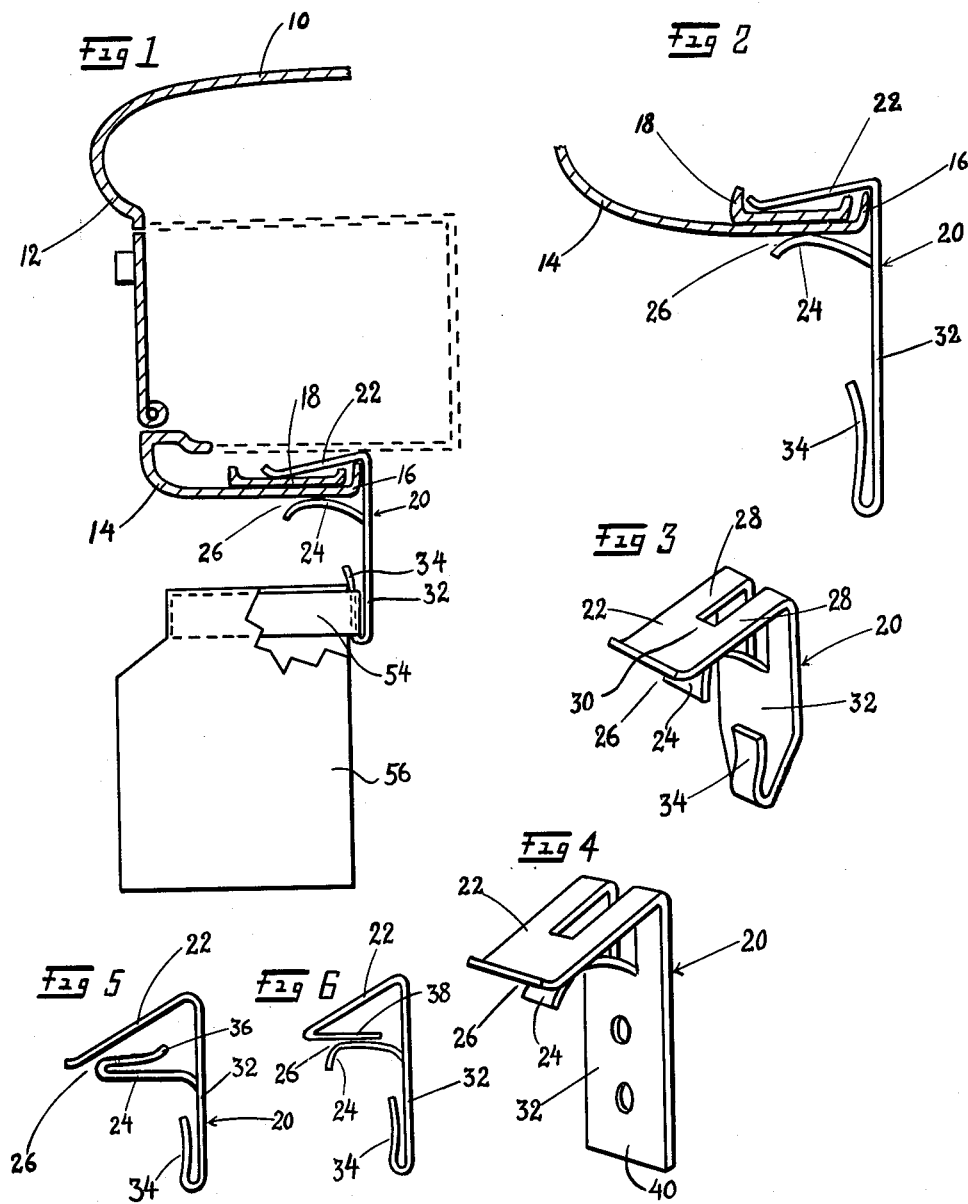
INVENTOR.
WILLIAM G. FALTIN
BY
ATTORNEY

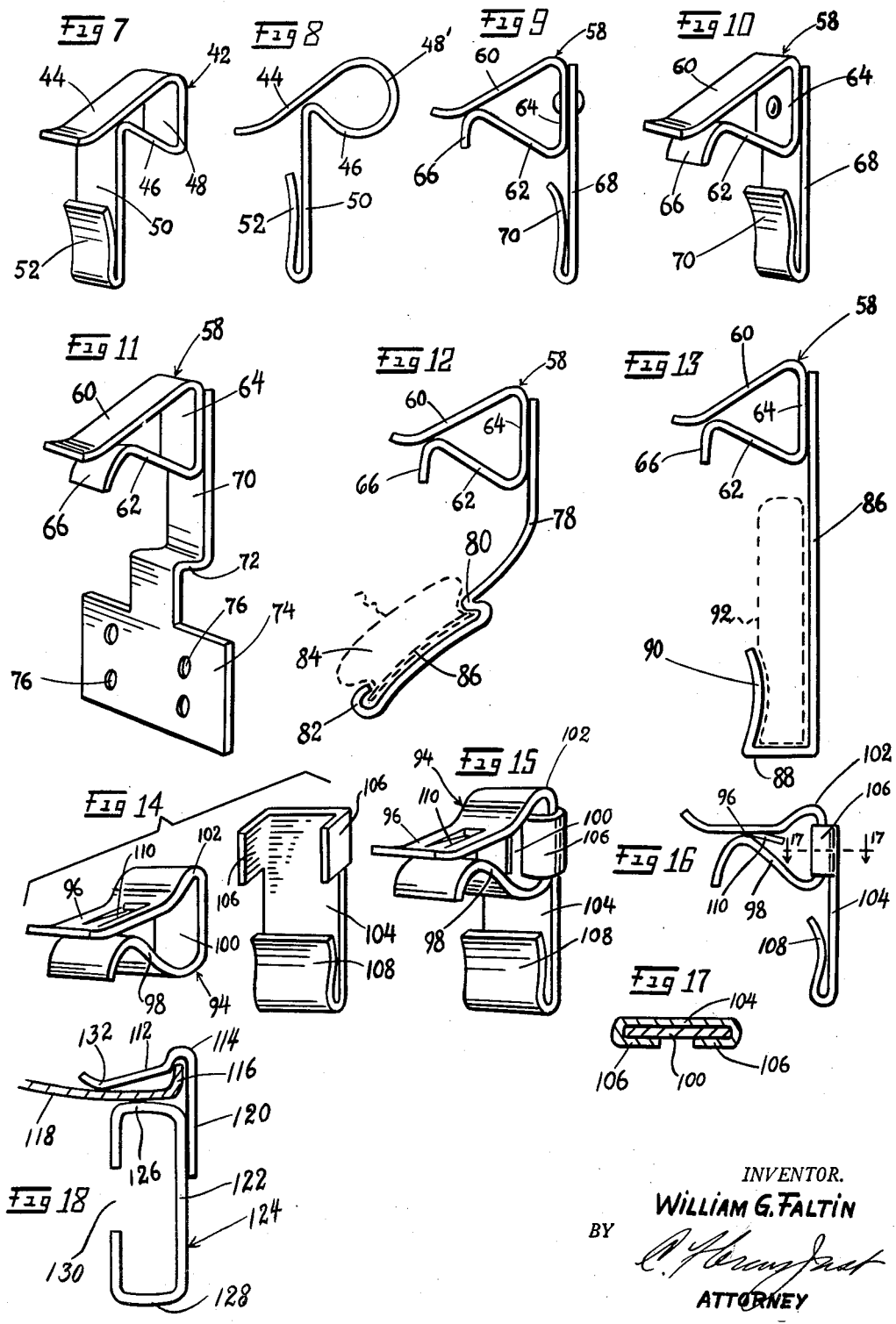

United States Patent Office 3,019,954
Patented Feb. 6, 1962

3,019,954
CLIP FOR VEHICLE DASHBOARD
William G. Faltin, Box 1362, York, Pa.
Filed Dec. 19, 1957, Ser. No. 703,884
2 Claims. (Cl. 224—42.46)

This invention relates to a clip suitable for ready attachment to the inner edge of a dash panel of a vehicle for purposes of providing supporting means for receptacles, packages, and other items to be held conveniently by such dash panel. At present, various types of clips are in use for the attachment of different items to the dash panel of a vehicle, most of said brackets including rigid arms and having threaded clamping screws and the like and such brackets supporting various types of control switches, ash trays, electric sockets, cigarette lighters, and many other articles useful to the occupants of the vehicle.

The principal object of the present invention is to provide a simple and inexpensive spring-type clip structure capable of being quickly attached to the inner edge of the dashboard or panel of a vehicle, whereby said clip may be attached simply by snapping the same onto the dash panel and no additional connecting means are required.

Another object of the invention is to provide a number of different embodiments of clip structure respectively affording various advantages from the standpoint of manufacturing costs, ease of manufacture, and adaptation to dash panels of different styles, shapes and dimensions.

A further object of the invention is to provide a clip structure of the type described which may be connected to various types of supporting means for receptacles, packages and other particles of different shapes and natures, such attaching means being operated upon a principle common to all of the embodiments.

Details of the foregoing objects and of the invention, as well as other objects thereof, are set forth in the following specification and illustrated in the accompanying drawings comprising a part thereof.

In the drawings:

FIG. 1 is an exemplary vertical side elevation illustrating one embodiment of clip structure which includes the principles of the invention and is illustrated attached to a vertical sectional illustration of an exemplary dash panel of a vehicle, one exemplary form of receptacle being shown supported by the clip.

FIG. 2 is a view similar to FIG. 1 but illustrating the clip per se attached to a vertically sectioned portion of a dash panel of a vehicle, the latter being only fragmentarily illustrated.

FIG. 3 is a perspective view of one embodiment of clip such as illustrated in FIGS. 1 and 2.

FIG. 4 is a view similar to FIG. 3 but showing a slightly different embodiment of depending member.

FIGS. 5 and 6 respectively are side elevations of clips of the type shown in the preceding figures but showing different additional locking means associated respectively with the jaws of the clip.

FIG. 7 is a perspective view of a clip comprising a different embodiment from those shown in the preceding figures.

FIG. 8 is a side elevation of a clip similar to that shown in FIG. 7 but showing a somewhat different shape of connecting means for the jaws of the clip.

FIGS. 9 and 10 respectively are a side elevation and perspective view of still another embodiment of clip structure incorporating the principles of the invention.

FIG. 11 is a side elevation of a clip similar to that shown in FIGS. 9 and 10 but showing a still further type of depending member.

FIG. 12 is a side elevation of a clip similar to that shown in FIGS. 9 through 11 but including means to support a small pack of cleansing tissues.

FIG. 13 is a side elevation of a clip similar to that shown in FIGS. 9 through 12 but showing a still different type of means for supporting an article.

FIG. 14 is an exploded perspective view of still another form of clip and supporting member to be connected thereto.

FIG. 15 is a perspective view of the clip structure shown in FIG. 14 but assembled for use.

FIG. 16 is a side elevation of the clip assembly shown in FIGS. 14 and 15.

FIG. 17 is a transverse sectional view taken on lines 17—17 of FIG. 16.

FIG. 18 is a side elevation of a still further embodiment of clip structure utilizing the principles of the invention.

The dash board or panel of a modern vehicle usually has an upper surface 10, a front face 12, and a lower inwardly directed portion 14, terminating in an inner or rearward edge 16 which is bent upward into a terminal flange. The lower portion 14 also may include a channel-shaped reinforcing member 18 and it is this inner edge 16 and channel 18 to which the present invention preferably is applicable.

Referring to FIGS. 1 and 2 particularly, one embodiment of clip 20 is shown therein which may be made inexpensively from spring steel strip material upon automatic machines which stamp and bend the same into the desired lengths and configurations illustrated in these figures.

This embodiment of clip comprises an upper jaw 22 and a lower jaw 24 which preferably is struck from the sheet steel spring stock and bent so as to provide an outwardly flared entrance end 26 between the jaws.

The upper jaw 22 may be formed as shown in FIG. 3 so as to comprise a pair of parallel fingers 28 which are connected by a transverse portion 30 comprising the forward end of jaw 22. Depending member 32 extends downwardly from the jaws 22 and connects jaw 24 thereto. In normal use, as shown in FIGS. 1 and 2, the opposite end of this embodiment of the depending member is bent upwardly upon itself to provide a hook 34, the opening within said hook extending substantially vertically in use. It also will be seen that the jaws 22 and 24 initially extend angularly toward each other at the outer ends to define an acute angle therebetween from said outer ends of the jaws and the opening between the jaws extends substantially horizontally in use or transversely to the opening of the hook 34. Preferably, the end 30 of jaw 22 extends beyond the outer end of jaw 24 to facilitate attaching the clip to the rear edge 16 of the dash panel, while the outer end of jaw 24 extends downwardly to facilitate pushing or pulling the clip during attaching operations.

The embodiment shown in FIG. 4 has a depending portion 32 which is substantially planar and has several holes therein which may receive rivets or bolts for attachment of a receptacle or other articles thereto.

Referring to FIG. 5, it will be seen that the lower jaw 24 may be provided at its outer end with a reversely bent tongue 36 comprising a locking tongue for frictional engagement with the lower surface of the dash panel to minimize accidental removal of the clip therefrom.

In FIG. 6, a somewhat different form of locking means is provided, the same comprising an inwardly bent outer end 38 on the upper jaw 22. This type of locking means particularly is effective for engaging the upstanding flange 16 or one of the ribs of the reinforcing channel member 18, thereby preventing accidental disengagement of the clip with the dash panel.

It will be noted from the foregoing figures that the depending member 32 in all of the above described figures extends from the inner ends of the clamping jaws 22 and 24. This structure is advantageous in that the entire load supported by the clip is sustained primarily by the upper jaw 22 which engages the channel member 18 or terminal flange 16 of the dash panel near the junction of the upper jaw 22 with the depending member 32, thereby affording a structure capable of sustaining substantial weights without deforming the jaw 22 beyond its elastic limit.

Particularly for purposes of providing a supporting hook which is disposed closer toward the front face 12 of the dash panel, a slightly different embodiment of clip 42 is shown in FIG. 7, wherein the upper jaw 44 and the lower jaw 46 are connected by a rear bight member 48, it being understood that this clip also is formed from strip spring materials such as steel and the clip is fabricated simply by bending a strip of the stock material into the desired shape as illustrated in the figure. In this embodiment the outer end of the lower jaw 46 is bent downwardly to form a depending member 50, the lower end of which is bent upon itself to form a hook 52.

As in regard to the above described embodiments, the space between the upper and lower jaws 44 and 46 extends substantially horizontally in use, while the space defined by the hook 52 extends substantially vertically in use, whereby the jaws 44 and 46 readily may be attached to the inner end of the dash panel of a vehicle, while the hook 52 readily may receive a supporting member such as a strip-like yoke 54 shown in exemplary manner in FIG. 1. Said yoke is connected to the upper end of a receptacle 56 so as to hold the upper end thereof open conveniently for receiving litter and the like, for example. The yoke 54 may be secured to the receptacle 56 in any suitable manner such as by being threaded through a hem in the upper edge thereof, or otherwise attached by cement or the like.

The embodiment of the invention shown in FIG. 8 is similar to that shown in FIG. 7 except that the bight member 48' is curved in side view as clearly shown in the figure, whereby the same might conform more readily to the shape of the inner edges of certain forms of dash panels.

In the embodiment shown in FIGS. 9 and 10, the clip 58 is formed from strip spring material such as spring steel and is provided with an upper jaw 60 and a lower jaw 62, the same being connected by a substantially flat bight member 64. The outer end 66 of jaw 62 is bent downwardly to provide a flared mouth for the clip 58 to facilitate reception therethrough of the rear edge of a dash panel. The opening between the jaws extends substantially horizontally to facilitate such reception of the dash panel. In this construction, a separate depending memebr 68 is connected to the bight member 64 of the clip by any suitable means such as soldering, spot welding, riveting, clamping or the like. The lower end of the depending member may be bent upon itself to provide a hook 70 which functions similarly to the hooks described above in regard to the preceding figures. Although the connection of the depending member 68 to the clip 58 requires an additional operation such as welding or the like, this construction offers certain latitude in shapes and sizes of depending members which are not possible as readily when using constructions such as illustrated in the preceding embodiments. End 66 also serves as manipulating handle.

The embodiment shown in FIG. 11 utilizes a clip 58 similar to that shown in FIGS. 9 and 10, while a different depending member 70 is connected at its upper end to the bight member 64 of clip 58 by welding, riveting, or otherwise. Member 70 has a forwardly offset portion 72 intermediately of the ends thereof, the lower end 74 thereof being wider than the remainder of member 70 and provided with holes 76 to receive bolts or rivets by which a receptacle or other article may be attached thereto. The wider lower end 74 affords a substantial area for such connection. The member 70 need not be spring material unless desired. It also may be of any desired width.

Rather than provide a hook on the lower end of the depending member as in FIGS. 9 and 10, it will be seen from FIG. 12 that the depending member 78 may be formed to provide several reversely bent gripping or clamping members 80 and 82, between which a small package 84, such as a pack of cleansing tissues or the like, may be clamped by the clamping members engaging opposite edges of a stiff sheet of cardboard 86 or the like provided in such packages. The depending member 78 may be made from strip spring stock such as that from which the clip 58 is made, if desired, whereby the clamping members 80 and 82 readily may be sprung apart to either release or receive the package 76. If desired however, member 78 may be made from normal, non-spring metal stock and the package 84 may be attached to the members 80 and 82 by bending the cardboard 86 to snap it between members 80 and 82.

Relatively large sized packages also are capable of being supported by clip structures made in accordance with the present invention. Whereas the clips described hereinabove relative to the preceding embodiments preferably are made from relatively narrow strip stock of spring steel or the like, when larger packages are to be supported, it is preferred that the clip, or at least the depending member connected thereto, be formed from wider gauge stock. In the embodiment shown in FIG. 13, the clip 58 is similar at least in side elevational shape to that shown in FIGS. 9 through 12 but a relatively wide depending member 86 is provided having an exemplary bottom shelf-like member 88 and an upstanding front flange 90, which may be of spring material, if desired, so as to clampingly hold a package 92 against depending member 86. The package 92 may be a larger box of cleansing tissues than shown in FIG. 12, for example. The height of flange 90 is selectable to hold a desired package adequately.

Still another embodiment of clip assembly incorporating the principles of the invention is shown in FIGS. 14 through 17. The clip 94 is formed from spring strip stock and comprises an upper jaw 96, a lower jaw 98, and an integral bight portion 100 connecting the same. The junction of bight portion 100 with upper jaw 96 is such as to provide a channel portion 102 for purposes of receiving the terminal flange 16 of the dash panel for example and thereby afford more secure positioning and attachment of the clip thereto by affording a three point contact of the clip with the dash panel. Otherwise the clip 94 is similar to clip 58 of FIGS. 9 through 13 in construction and function.

The hook member 104 preferably is formed from non-spring strip stock and is provided with a pair of ears 106 which are bent around bight portion 100, as shown in FIGS. 15 and 16, to connect the member 104 to clip 94 effectively and inexpensively. The lower end of member 104 is bent upwardly to form a hook 108. FIG. 17 illustrates in cross-section the manner in which ears 106 engage bight portion 100 of clip 94, as seen on line 17—17 of FIG. 16. If desired, the jaw 96 also may be provided with a locking tongue 110 struck therefrom for engagement with the terminal flange 16 of the dash panel shown in FIGS. 1 and 2.

The embodiment shown in FIG. 18 comprises a flexible upper clip 112 preferably having a channel portion 114 which receives the rear flange 116 of dash panel 118 of a vehicle. The clip 112 has a rearward depending member 120 which may be attached to the rear wall 122 of a holder 124 by any suitable means such as riveting, welding, or the like. The holder 124 preferably is channel-shaped in cross-section, as clearly shown in FIG. 18, and the upper flange 126 comprises the lower jaw of the attaching clip by cooperating with upper flexible jaw 112. Holder 124 may be formed either from spring stock, or non-spring stock, as best suited to retain any specific object therein such as a pack of cleansing tissues. The lower flange 128 of holder 124 cooperates with upper flange 126 to hold such articles, and both flanges preferably have terminal ends bent toward each other to provide an access slot or space 130. Packages may be inserted endwise into holder 124.

As in regard to the embodiment shown in FIGS. 14 through 17, it will be seen that the clip structure shown in FIG. 18 provides a three-point engagement with the dash panel 118 in that the flared end 132 and channel member 114 engage the top surface of the dash panel at spaced points or locations, while the upper surface of flange 126, comprising the lower jaw of the clip, engages the lower surface of the dash panel intermediately of the points engaged by end 132 and portion 114.

From the foregoing, it will be seen that the clip structure comprising the various embodiments of the present invention, in which embodiments substantially the same advantages exist, may be manufactured inexpensively, yet affords a highly useful means for quickly and securely attaching to the dash board or panel of a vehicle various types and kinds of packages, receptacles and other articles of convenience to occupants of the vehicle. The clip may easily be disconnected from the dash panel of the vehicle when desired and also may be quickly remounted upon the dash panel. Further, the clip affords hook-like means which engage the edge of the dash panel in such a manner that it is capable of sustaining substantial weights without deforming the clip beyond its elastic limits.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:
1. A clip unit connectable to the substantially horizontal inner end of a dash panel of a vehicle for supporting an article in depending relationship from said dash panel and comprising in combination, a resilient unitary U-shaped clip formed from strip-like spring material continuously integral from end to end and affording a pair of opposing gripping jaws connected by a bight portion and said jaws being arranged to receive therebetween and respectively engage the opposite surfaces of said inner end of a dash panel for quick engagement and disengagement therewith, said jaws initially sloping toward each other at the outer ends and being substantially in engagement with each other when not in use, a supporting member formed from strip material of substantially the width of the strip-like spring material of the U-shaped clip, and ears formed upon opposite sides of one end of said supporting members and being folded tightly around the opposite side edges of said bight portion of said U-shaped clip to secure said one end of said supporting member to said clip, said supporting member depending from and being substantially parallel to the bight portion of said U-shaped clip, whereby said jaws extend substantially transversely from said supporting member, the lower portion of said depending supporting member having means for connecting the same to an article to be supported by said clip and supporting member relative to the dash panel of a vehicle.

2. The clip unit set forth in claim 1 further characterized by one of said jaws adjacent said bight portion having a channel portion extending away from the opposite jaw to receive an edge of the inner end of a vehicle dash panel to which the unit is attachable and the other jaw being shorter than said one jaw, whereby said dash panel will be engaged on one surface at two spaced locations and on the other surface at a single location intermediately of said two locations to cause effective clamping contact between said jaws and dash panel.

References Cited in the file of this patent
UNITED STATES PATENTS

| | | |
|---|---|---|
| 511,944 | Gordon | Jan. 2, 1894 |
| 810,004 | Tabler | Jan. 16, 1906 |
| 1,407,474 | Nielsen | Feb. 21, 1922 |
| 1,531,229 | Bernstein | Mar. 24, 1925 |
| 1,856,847 | Gates | May 3, 1932 |
| 2,058,982 | Hollingsworth | Oct. 27, 1936 |
| 2,387,892 | Ellis et al. | Oct. 30, 1945 |
| 2,665,103 | Flora et al. | Jan. 5, 1954 |
| 2,721,680 | Steckman | Oct. 25, 1955 |
| 2,843,301 | Worthen | July 15, 1958 |
| 2,884,174 | Davitt | Apr. 28, 1959 |

FOREIGN PATENTS

| | | |
|---|---|---|
| 649,237 | Great Britain | Jan. 24, 1951 |